United States Patent [19]
Prodan

[11] Patent Number: 4,959,715
[45] Date of Patent: Sep. 25, 1990

[54] METHOD AND APPARATUS FOR CONVERTING AN INTERLACED TELEVISION TRANSMISSION TO A SEQUENTIAL DISPLAY USING MAXIMUM LIKELIHOOD ESTIMATION

[75] Inventor: Richard S. Prodan, Reston, Va.

[73] Assignee: North American Philips Corporation, New York, N.Y.

[21] Appl. No.: 367,521

[22] Filed: Jun. 16, 1989

[51] Int. Cl.$^5$ .............................................. H04N 7/01
[52] U.S. Cl. ...................................... 358/140; 358/138
[58] Field of Search .................. 358/140, 138, 160, 11

[56] References Cited

U.S. PATENT DOCUMENTS

| | | | |
|---|---|---|---|
| 4,551,753 | 11/1985 | Nishizawa | 358/138 |
| 4,673,978 | 6/1987 | Dischert | 358/140 |
| 4,698,675 | 10/1987 | Casey | 358/140 |
| 4,879,599 | 11/1989 | Honda | 358/138 |

Primary Examiner—Howard W. Britton
Attorney, Agent, or Firm—Michael E. Marion

[57] ABSTRACT

A method and apparatus for detecting a maximum vertical frequency component in a received interlaced transmission and substituting therefore, a uniform zero vertical frequency component in order to form a sequential scan display without introducing motion induced artifacts.

3 Claims, 6 Drawing Sheets

AT TIME OF FIELD 1

AT TIME OF FIELD 2

FIELD 1

FIELD 2

TOTAL FRAME
(FIELD 1 & FIELD 2)

MAGNITUDE OF THE FREQUENCY RESPONSE OF THE SUBTRACTOR AS A FUNCTION OF THE VERTICAL FREQUENCY (CYCLES PER PICTURE HEIGHT) NORMALIZED BY THE NUMBER OF SCAN LINES PER FRAME N.

FIG. 6(a)
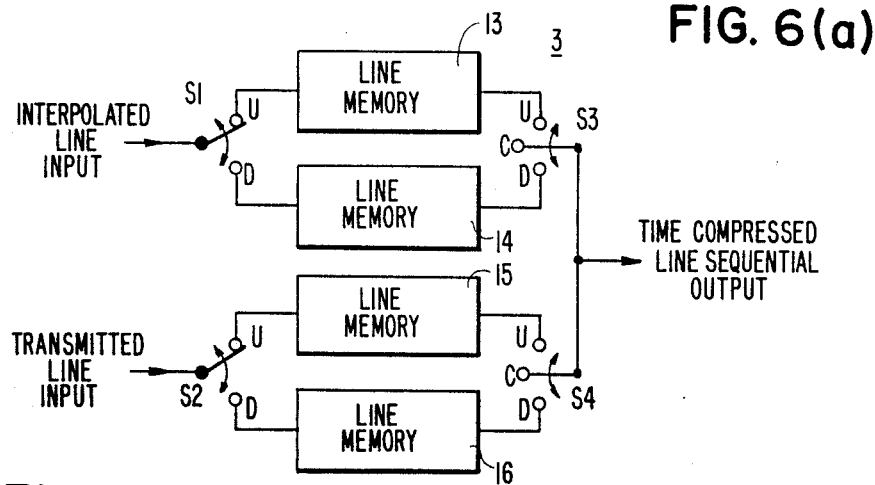
FIG. 6(b)
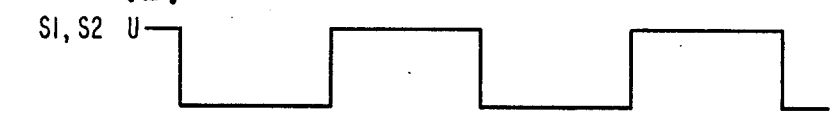
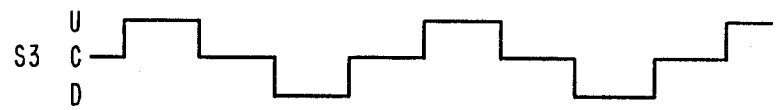
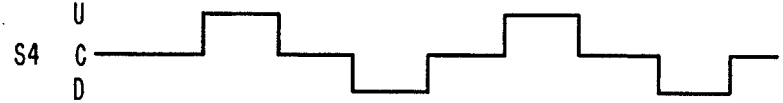
FIG. 6(c)

METHOD AND APPARATUS FOR CONVERTING AN INTERLACED TELEVISION TRANSMISSION TO A SEQUENTIAL DISPLAY USING MAXIMUM LIKELIHOOD ESTIMATION

BACKGROUND OF THE INVENTION

Conventional television systems utilize an interlaced scanning method to transmit pictures, each consisting of two fields. In order to conserve bandwidth, maximize vertical resolution, and reduce large area flicker, interlaced scanning provides an increased field rate by scanning alternate line positions in alternate fields. The resulting display at the receiver, however, can exhibit artifacts such as visibility of the scanning lines, line flicker on vertical detail, line crawl or pairing, breakup or serrating of moving edges, and loss of vertical resolution.

A sequential scanning method results in a retrace of the same lines of both fields every vertical sweep. By converting the interlaced signal into a sequentially scanned display at the receiver, a substantial reduction of the artifacts caused by interlaced scanning will be achieved.

SUMMARY OF THE INVENTION

The invention comprises a method and apparatus for converting an interlaced transmission to a sequential scan display. Several scan lines are sampled and are used to estimate a single non-random parameter. This parameter is used to determine if a maximum vertical frequency component is present. If so, movement is assumed to have caused the component and a zero vertical frequency component is substituted for it.

The invention is based in part on the observation that for representative television transmissions, the probability that a maximum vertical frequency component is produced by moving contours is much greater than the probability of the presence of precisely that component in a stationary pattern.

A Maximum Likelihood Estimation ("MLE") interpolator is used to provide a sequential scan line between two received interlaced lines, at the receiver.

BRIEF DESCRIPTION OF THE DRAWINGS

FIG. 6a is a block diagram of the parallel-to-serial converter and line compressor of FIG. 3.

FIG. 5b describes the position of switches S1–S4 in FIG. 6a, as a function of time.

FIG. 6c describes the sequence of interlaced input lines and compressed sequential output lines.

DETAILED DESCRIPTION OF THE INVENTION

A video signal is obtained by horizontally scanning an image with a point aperture or spot, thereby producing a raster of vertically displaced scan lines that repeats periodically to temporally update the information sampled by the raster. In the NTSC television format, for example, the scan lines of alternate fields are displaced so as to interleave, resulting in an interlaced scan. Thus the video signal represents a three dimensional image field (horizontal, vertical, and temporal) that is sampled in two of the three dimensions (vertical and temporal) to map the information into a one dimensional signal for transmission. It is this two dimensional sampling process that is responsible for display artifacts due to aliasing of vertical frequencies into temporal frequencies and vice versa.

Figure 1A:
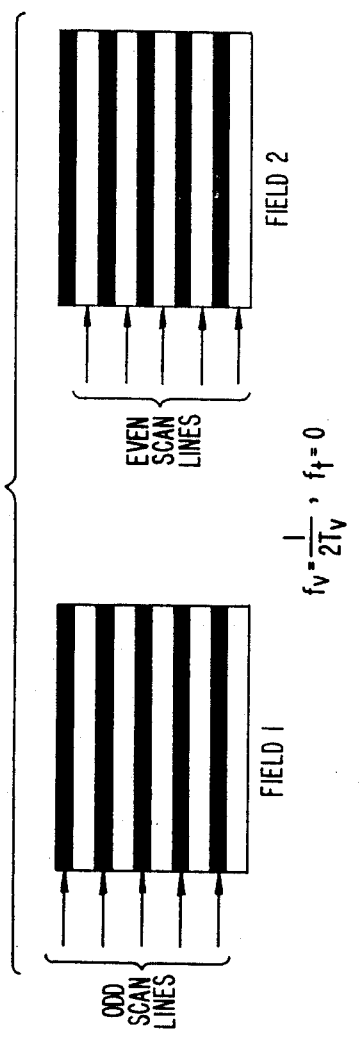
FIG. 1a describes a stationary vertical pattern of alternating black and white lines.
Figure 1B:
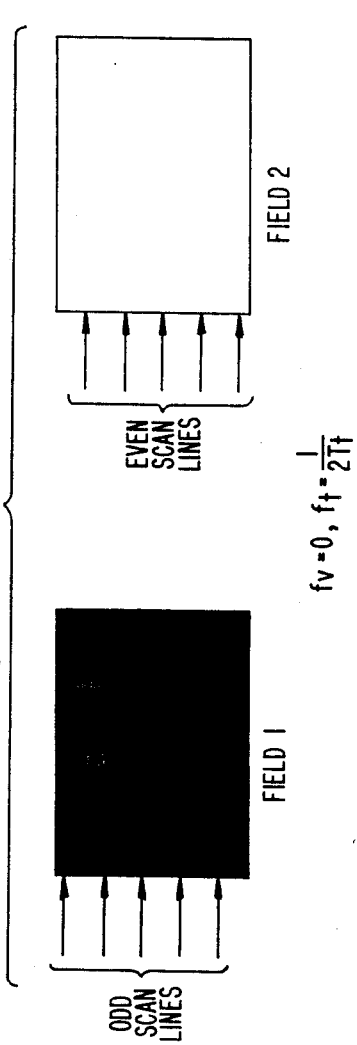
FIG. 1b describes a uniform raster alternating between black and white at the frame rate.
Figure 2A:
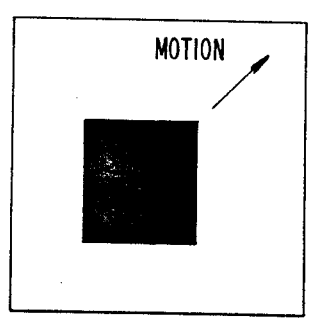
FIG. 2a describes the position of a box image during field one of a picture.
Figure 2B:
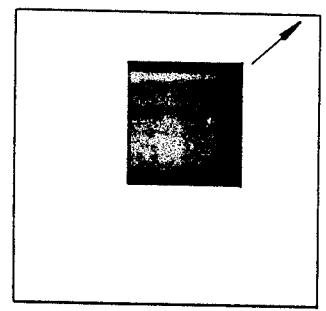
FIG. 2b describes the position of the box image in field two of the picture.
Figure 2C:
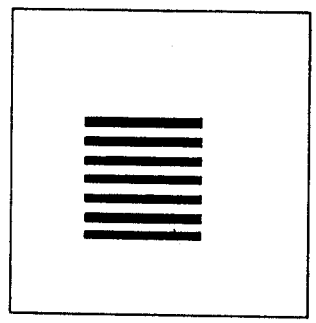
FIG. 2c describes the interlaced scanning of field one.
Figure 2D:
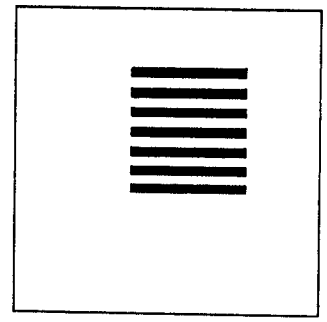
FIG. 2d describes the interlaced scanning of field two.
Figure 2E:
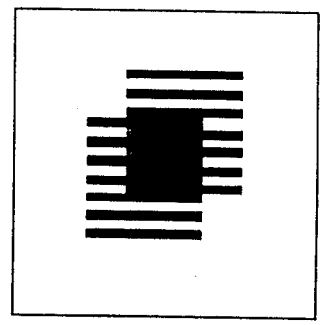
FIG. 2e describes to received interlaced picture comprising fields one and two.

NTSC provides for a 525 line raster interlaced over two 60 Hz fields resulting in a 30 Hz frame rate. With the NTSC format, the interlaced display at the receiver of a transmitted signal consisting of a stationary vertical pattern of alternating interlaced black and white lines corresponding to a maximum vertical frequency component of 262.5 cycles per picture height ("cph") (FIG. 1a) will be indistinguishable from a uniform zero vertical frequency raster alternating between white and black at the temporal frame rate of 30 Hz (FIG. 1b). In both cases, the received display will show a vertical pattern of alternating black and white lines. This 30 Hz temporal frequency component is perceived as line flicker when a high vertical frequency stationary pattern is interlace scanned. Similarly, a moving contour or edge producing a temporal frequency due to field to field positional change will appear to have a vertical frequency of 262.5 cycles per picture height along the moving edge which appears as a jagged or serrated pattern along the edge. Alternate lines near the top and bottom of a vertically moving object are omitted which also results in a maximum vertical frequency component of 262.5 cycles per picture height. These motion artifacts are illustrated in FIGS. 2a–2e for a black box moving diagonally across a white background. Notice that this situation corresponds to a maximum vertical frequency component, for example 262.5 cph produced by a temporally changing raster with a temporal frequency, for example, of 30 Hz. as shown in FIG. 1b.

The invention comprises means for detecting a maximum vertical frequency component in a received interlaced transmission and substituting therefor, a uniform zero vertical frequency component in a sequential scan display. Vertical frequency patterns of lower than the maximum frequency are unchanged in the sequential scan conversion since they are unlikely to have been produced by movement between fields.

The invention utilizes an observation of several scan line samples whose values are random variables to estimate a single non-random parameter. This parameter is used to determine if a maximum vertical frequency component is present. If so, movement is assumed to have caused this maximum vertical frequency component and a zero vertical frequency component is substituted for it in the sequential display.

Figure 3:
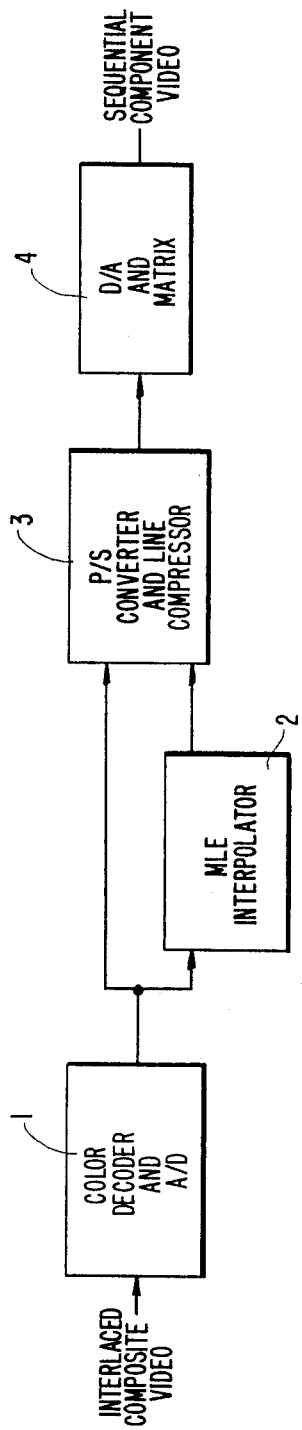
FIG. 3 is a block diagram of an embodiment of an interlaced to sequential scan converter comprising the invention.

One embodiment of the invention which describes an interlaced to sequential scan converter using maximum likelihood estimation is shown in FIG. 3. At the receiver a standard interlaced composite video signal is provided as the input to a color decoder and analog-to-digital (A/D) converter 1 which converts the analog video signal into three digital signals comprising component sample streams of either one luminance and two color difference signals, or red, green, and blue (RGB) signals. The digital signals are supplied as the input to a maximum likelihood estimation (MLE) interpolator 2 and a parallel-to-serial (P/S) converter and line compressor 3. The MLE interpolator 2, discussed in detail below, provides an interpolated scan line spatially adjacent to a currently transmitted scan line, which corresponds to the missing interlace line position between the currently transmitted line and a previously transmitted line. Both the currently transmitted line and the interpolated line are simultaneously provided in parallel as inputs to the parallel-to-serial converter and line compressor 3, which takes the pair of lines into a buffer and reads them out at double speed, sequentially. The output of the parallel-to-serial converter and line compressor 3 provides a sequential scan format with half the line scanning time and double the number of scanning lines per field. Thus all the lines of the frame of the transmitted picture which were scanned in two interlaced fields are converted to a sequential scan in only one field time.

For example, with the NTSC television system as input, 525 lines are sequentially scanned from top to bottom of the display at the output of line compressor 3 each 1/60th of a second. This digital sequential video output is provided as the input to a digital to analog (D/A) converter and matrix 4 which converts the digital sequential video output to analog RGB signals for sequential display at double the NTSC line rate.

The color decoding and matrixing, and the A/D and D/A conversion in the first and last system modules are standard practice for those skilled in the art.

Figure 4:
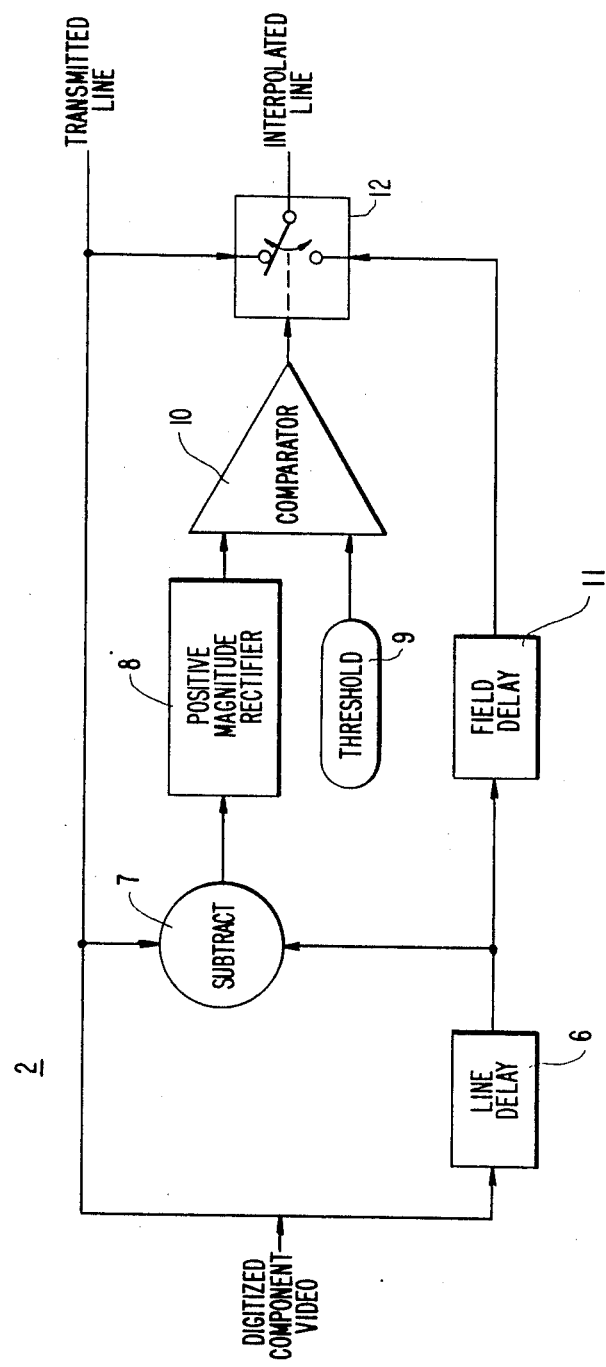
FIG. 4 is a block diagram of the MLE interpolator of FIG. 3.

The maximum likelihood estimation (MLE) interpolator 2, as shown in detail in FIG. 4 interpolates the missing lines in the interlaced scan. The digital video signal from color decoder and A/D converter 1 is supplied to line delay 6 and one input of subtractor 7 of the MLE interpolator 2. The output of the line delay 6, provides the other input to subtractor 7. The subtractor 7 calculates the difference between a sample value (for example, a pixel) of a currently transmitted line and a vertically adjacent sample value of a previously transmitted line of the same field. The rectifier 8 takes the positive magnitude of the difference signal from the output of subtractor 7.

Figure 5:
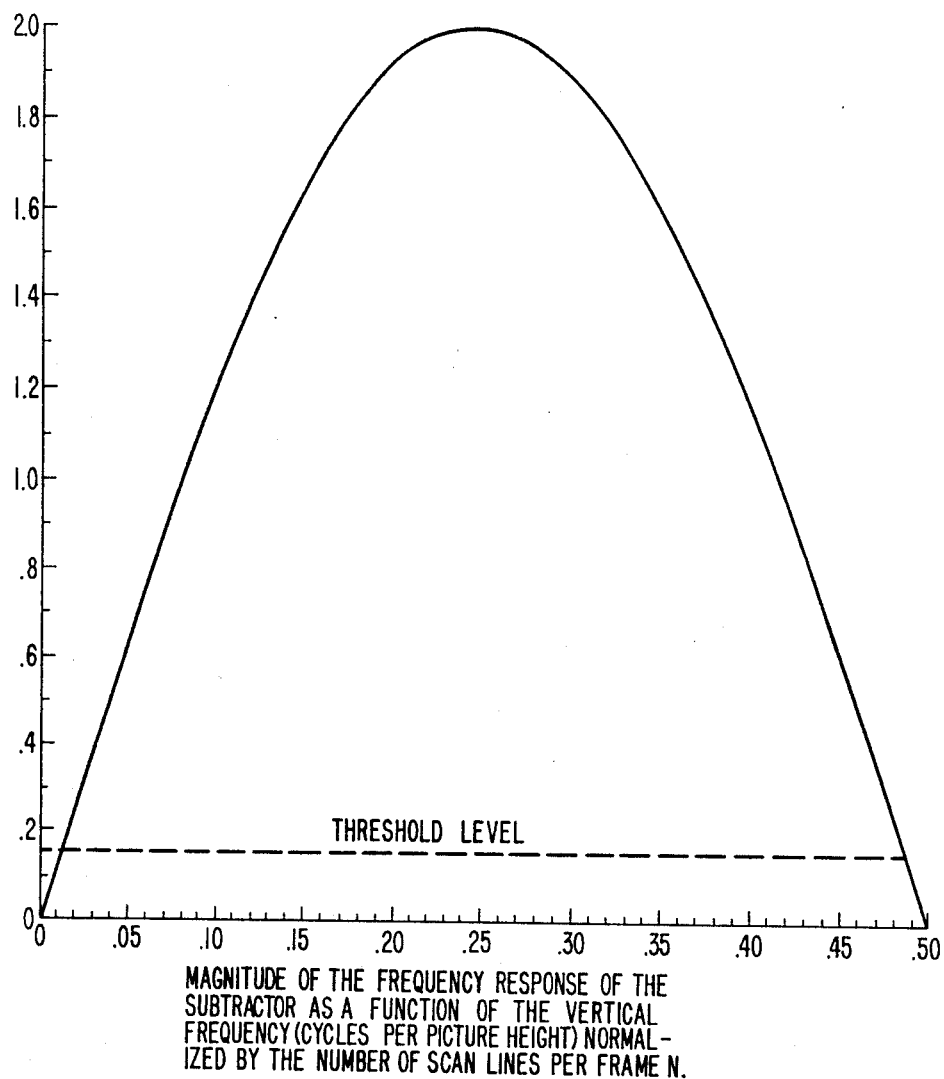
FIG. 5 is a graph describing the magnitude of the frequency response of the subtractor of FIG. 3, as a function of the vertical frequency (cph) normalized by the number of scan lines per frame N.

The frequency response of the subtractor 7, shown in FIG. 5 is given by the formula $$|H(f)| = 2 \sin(2\pi f/N), \quad 0 \leq f \leq N/2$$

where N is the number of lines per frame (for example 525 in the U.S.; 625 in Europe), and f is the vertical frequency in cycles per picture height. The frequency response is a band pass characteristic with center frequency N/4 cycles per picture height (cph) and has zero response at zero cph and N/2 cph. Note that N/2 cph is the maximum vertical frequency that can be reproduced by an N line raster. Thus the rectified difference signal of two adjacent line samples within the same field provides the estimate of the vertical frequency at the output of rectifier 8. A value near zero would indicate either the maximum vertical frequency N/2 cph, caused by a moving contour, or a zero vertical frequency caused by a uniform stationary area of the raster.

A threshold reference 9 provides a reference value near zero, chosen for random noise immunity as shown in FIG. 5. The reference value 9 is provided to one input of comparator 10 and the output of rectifier 8 is provided to the other input of comparator 10. If the output of rectifier 8 is below the reference value, the output of comparator 10 indicates that the maximum vertical frequency is present, which is likely to be caused by a moving contour. If the output of rectifier 8 is above the reference value, then the output of comparator 10 indicates that a lower vertical frequency is present which is likely to be caused by a stationary pattern. Thus the output of comparator 10 is the parameter indicating a pixel where motion between fields causes the artifact of FIG. 2e. This parameter is used to switch multiplexer 12 so as to select between two alternatives for interpolating the individual samples of the missing scan line in the interlaced field midway between the scan lines of the field where the vertical frequency is estimated.

If a substantial change between vertically adjacent pixels in the same field is detected, the output of comparator 10 causes multiplexer 12 to select as its output to the output of field delay 11. This sample from the line of the previous field has a delay of (N+1)/2 lines where N is the (odd) number of lines per frame. If only a small change is detected, the output of comparator 10 causes multiplexer 12 to select as its output, the sample of one of the actual lines used in the estimation process as received from color decoder and A/D converter 1.

Comparator 10 and switch multiplexer 12 can be replaced with a circuit arrangement which, depending on the difference between the reference value and the output of rectifier 8, provides an interpolated line value which is a function of that difference. This can be accomplished by substituting for example, a ROM programmed to compensate for noise in the inputs from reference 9 and rectifier 8, i.e., by outputting programmed ramp values in response to the difference in the inputs. The output of the ROM would then control a potentiometer which would select interpolated line values between the delayed field value and the transmitted line value, which is function of the programmed value from the ROM.

The invention replaces the maximum vertical frequency component caused by the interlaced scanning of moving edges with the zero vertical frequency component that would be present if sequential scanning were used at the source and in the transmission as well as the display. Note that zero vertical frequency components that are detected as a maximum vertical frequency are unaltered as selected by multiplexer 12 since all lines are equal in this case and one is free to choose any sample amongst neighboring scan lines.

The transmitted line of the interlaced field and the interpolated line produced by maximum likelihood estimation interpolator 2 are then supplied simultaneously to a parallel-to- serial converter and line compressor 3 as shown in more detail in FIG. 6a. The interpolated output from the MLE Interpreter 2 is read alternately into line memories 13 and 14 under the control of switch S1. The digital output directly from color decoder and analog-to-digital converter 1 is read alternately into line memories 15 and 16 under the control of S2. With reference to FIGS. 6(a)–6(c), assume both S1 and S2 are in the down (D) position during the period of interpolated line 1 which is coincident with the period of transmitted line 2 and lines 1 and 2 have been stored in line memories 14 and 16 respectively. During the next period of input lines 3 and 4, switches S1 and S2 are in the up (U) position reading lines 3 and 4 respectively into the alternate pair of line memories 13 and 15. During the first half of this period, line 1 is read out at double speed from line memory 14 via switch S3 which is in the down (D) position while switch S4 is floating in the center (C) position. During the last half of this period, line 2 is read out at double speed from line memory 16 via switch S4 which is in the down (D) position and switch S3 is in the center (C) position. During the next period switches S1 and S2 return to the down (D) position reading lines 5 and 6 into line memories 14 and 16 respectively. During the first half of this period, line 3 is read out at double speed from line memory 13 via switch 53 which is in the up (U) position while switch S4 is floating in the center (C). During the last half of this period line 4 is read out at double speed from line memory 15 via S4 which is in the up (U) position while switch S3 is floating in the center (C). The switch positions and the parallel inputs and time compressed sequential output are shown in FIGS. 6b and 6c.

As previously explained in FIG. 3, the double scan rate lines are supplied as the input to the D/A and matrix module where the time compressed line sequential digital component video signal is converted back to analog signals by digital to analog converters. The analog signals are supplied to a sequential double line rate display after appropriate matrixing into RGB signals.

Although a specific embodiment of this invention has been shown and described, it will be understood that various modifications may be made without departing from the spirit of this invention.

What is claimed:

1. A method for converting an interlaced television signal into a sequential television signal for display, said method comprising the steps of:
   (a) digitally sampling said interlaced television signal to derive a first digital sample from a current interlaced line, a second digital sample from the previous interlaced line; and a third digital sample from the line of the previous field between the first and second samples;
   (b) generating an interpolated line from said three digital samples using maximum likelihood estimation; and
   (c) generating a sequential television signal from said current interlaced line and said interpolated line.

2. The method of claim 1 wherein said maximum likelihood estimation comprises the additional steps of:
   (a) subtracting said first digital sample from said second digital sample to obtain a difference signal;
   (b) rectifying said difference signal so as to obtain a vertical frequency estimate;
   (c) comparing said vertical frequency estimate with a reference value to obtain a control signal having a first state when said vertical signal estimate has a value below that of said reference value and a second state when said vertical frequency is above said reference value; and
   (d) selecting as said interpolated line sample under the control of said control signal, said first or second digital sample when said control signal is in said first state and a digital sample taken from a corresponding interlaced line from a previous field when said control signal is in said second state.

3. Apparatus for converting an interlaced television signal into a sequential television signal for display, said apparatus comprising:
   (a) means for digitally sampling said interlaced television signal to derive a first digital sample from the current interlaced line, a second digital sample from the previous second interlaced line; and a third digital sample from the line of the previous field between the first and second samples;
   (b) means for generating an interpolated line from said three digital samples using maximum likelihood estimation; and
   (c) means for generating a sequential television signal from said current interlaced line and said interpolated line.

* * * * *